United States Patent [19]

Kaneiwa et al.

[11] Patent Number: 4,588,935
[45] Date of Patent: May 13, 1986

[54] METHOD FOR CONTROLLING AUTOMOBILE DEVICE WHEN SENSOR OUTPUT IS ABNORMAL

[75] Inventors: Toshiyuki Kaneiwa, Oobu; Mamoru Shimamoto, Nagoya, both of Japan

[73] Assignee: Nippondenso Co., Ltd., Kariya, Japan

[21] Appl. No.: 686,406

[22] Filed: Dec. 26, 1984

[30] Foreign Application Priority Data

Dec. 27, 1983 [JP] Japan .................................. 252517

[51] Int. Cl.$^4$ ............................................. H02P 1/04
[52] U.S. Cl. .................................... 318/483; 318/480; 318/443; 318/DIG. 2; 318/444
[58] Field of Search ............... 318/441, 442, 443, 444, 318/445, 449, 450, 483, 641, 642, 643, DIG. 2; 307/116, 117, 118; 15/250 C

[56] References Cited

U.S. PATENT DOCUMENTS

| | | | |
|---|---|---|---|
| 4,037,146 | 7/1977 | Kondo | 318/DIG. 2 X |
| 4,054,819 | 10/1977 | Johnson | 318/449 X |
| 4,314,186 | 2/1982 | Gille et al. | 318/DIG. 2 X |
| 4,355,271 | 10/1982 | Noack | 318/DIG. 2 X |
| 4,419,611 | 12/1983 | Kawasaki et al. | 318/DIG. 2 X |
| 4,494,059 | 1/1985 | Kearns | 318/443 |
| 4,495,452 | 1/1985 | Boegh-Peterson | 318/DIG. 2 X |
| 4,499,410 | 2/1985 | Iacoponi et al. | 318/DIG. 2 X |
| 4,527,105 | 7/1985 | Shiraishi | 318/DIG. 2 X |

FOREIGN PATENT DOCUMENTS

58-64553  4/1983  Japan .
58-178043 11/1983 Japan .
58-179259 11/1983 Japan .

*Primary Examiner*—William M. Shoop, Jr.
*Assistant Examiner*—Shikluen Paul Ip
*Attorney, Agent, or Firm*—Cushman, Darby & Cushman

[57] ABSTRACT

A control method performed in response to the occurrence of an abnormal sensor output during the operation of monitoring the output signal of a sensor and controlling the operation of an automobile device such as a wiper. A microcomputer detects the presence or absence of an abnormal value of the sensor output signal converted to digital form so that when the abnormal value is detected, the operation of the automobile device is selectively controlled in accordance with an engine operating condition indicative signal applied to the microcomputer.

5 Claims, 3 Drawing Figures

METHOD FOR CONTROLLING AUTOMOBILE DEVICE WHEN SENSOR OUTPUT IS ABNORMAL

BACKGROUND OF THE INVENTION

The present invention relates to a control method responsive to an abnormal sensor output in a control system whose control operation is performed in accordance with the output of a sensor and more particularly to an abnormal sensor output responsive control method so designed that the operation of an accessory device of an automobile (hereinafter referred to as a vehicle) to be controlled is controlled by monitoring the outputs of a main and an auxiliary sensor and that the device is controlled suitably in accordance with the output of the auxiliary sensor upon detection of the abnormality of the output from the main sensor.

Where the accessory devices of a vehicle such as a vehicle air-conditioner, heater and automatic wiper are automatically controlled with the use of various sensors, if a fault occurs in a part of the control system including the sensor, etc., so that the accessory device is brought into an unexpected operation, this causes a feeling of uneasiness on the part of the user and not desirable to the user. Known wiper control devices are shown in Japanese Laid-Open Patent Applications No. 58-64553, No. 58-178043 and No. 58-179259 and an example of this type of automatic wiper control device is designed so that the light output of an infrared light emitting element (hereinafter referred to as an infrared LED) is received by a light sensor (main sensor) including photodiodes through the windshield whereby when rain drops deposit on the windshield, a decrease in the light sensor output is detected to bring the wiper into operation in rainy weather and the wiper operation is placed in an OFF mode, intermittent mode, low speed (low) mode or high speed (high) mode of operation in accordance with the rate of decrease of the output from the light sensor. This type of control device is disadvantageous in that if the infrared LED or the photodiodes become faulty or the optical axis is displaced by vibrations or the like or the light output from the infrared LED is intercepted by the hand or the like, the output of the photodiodes is reduced by such a great amount which is never likely in the normal conditions and thus the wiper is brought into an undesirable operating condition.

SUMMARY OF THE INVENTION

With a view to overcoming the foregoing deficiencies in the prior art, it is an object of the present invention to provide a method of controlling an automobile device in response to an abnormal sensor output wherein in a control system for monitoring the output signal of a main sensor to control the operation of the vehicle device, a microcomputer detects the presence or absence of any abnormal value of the main sensor output signal converted to a digital value and the microcomputer also utilizes, as a reference signal, a signal indicative of an engine operating condition, e.g., an engine rotational speed and applied to it from another sensor (auxiliary sensor) for controlling the engine operating condition whereby when the abnormal value is detected, in accordance with the reference operating condition indicative signal the corresponding mode of operation is selected and the vehicle device is controlled.

DESCRIPTION OF THE PREFERRED EMBODIMENT

Figure 1:
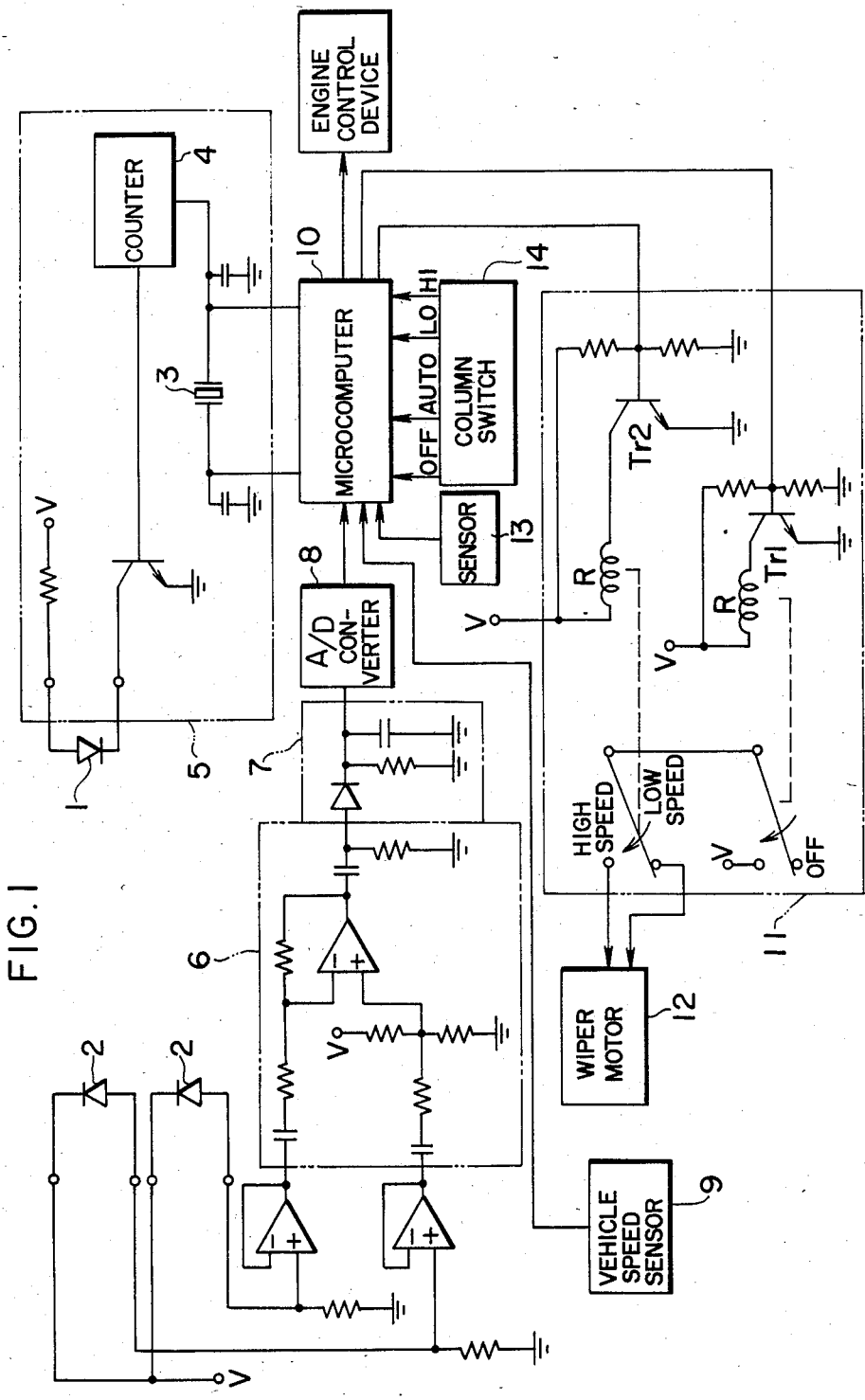
FIG. 1 is a schematic circuit diagram of an automatic wiper automatic control device for automobiles showing an embodiment of the invention.

FIG. 1 shows an automatic wiper control device for automobiles including an infrared LED 1, a system including photodiodes 2 forming a main sensor, an LED drive circuit 5 including a crystal unit 3 for causing the infrared LED 1 to emit light and a counter 4, an ac amplifier circuit 6 for amplifying the output of the photodiodes 2, a rectifier circuit 7 for rectifying the output of the amplifier circuit 6, an A/D converter 8, an engine controlling vehicle speed sensor 9 forming an auxiliary sensor, a microcomputer 10 for receiving and processing these signals as well as a signal from another engine controlling sensor 13 and other engine controlling signals and a motor drive circuit 11. Connected to the microcomputer 10 is a column switch 14 which is used by the driver to select any desired one of the wiper operation modes (OFF, AUTO, Lo and Hi). When the AUTO mode is selected and set by the column switch 14 to control the wiper operation, the oscillation output of the crystal unit 3 for operating the microcomputer 10 is subjected to frequency division by the counter 4 so that a transistor is switched on and off and the infrared LED 1 is turned on and off. The resulting output light from the infrared LED 1 is detected by the photodiodes 2 arranged behind the windshield and applied to the ac amplifier circuit 6 which in turn separates the light output into an output component produced by the flashing light of the infrared LED 1 and a noise component other than the output component. The output of the amplifier circuit 6 is converted to a dc signal by the rectifier circuit 7, applied to the A/D converter 8 and then read by the microcomputer 10. Since the light from the infrared LED 1 is received by the photodiodes 2 through the intermediary of the windshield, when rain drops stick to the windshield, the output from the photodiodes 2 is decreased and the applied voltage to the A/D converter 8 is decreased thereby decreasing the data read by the microcomputer 10. In accordance with the rate of decrease of the data, the microcomputer 10 sends to the motor drive circuit 11 a signal or signals for selecting one of the OFF, low speed, high speed and the like modes of operation for the wiper motor. In response to the mode selecting signal or signals, the transistors of the motor drive circuit 11 are suitably switched and the corresponding relay (R) control contact or contacts are selected. On the other hand, in order to control the air-fuel ratio, the ignition timing, etc., of the engine, the output of the vehicle speed sensor 9 is applied to the microcomputer 10 and the vehicle speed is measured. When the data is decreased to such a level which would never be caused by any weather condition such as rain drops, that is, when the data is decreased to such a level which would be caused by a failure of the infrared LED 1 or the photodiodes 2, a displacement of the optical axis due to vibrations or the like, the blocking of the light by the hand or the like, the then current vehicle speed measured by the vehicle speed sensor 9 is used as a reference value so that when the vehicle speed is 10 km/h or less the operation of the wiper is stopped and when the vehicle speed is higher than 10 km/h the operation of the wiper being performed just before the decrease of the data is continued.

Figure 2A:
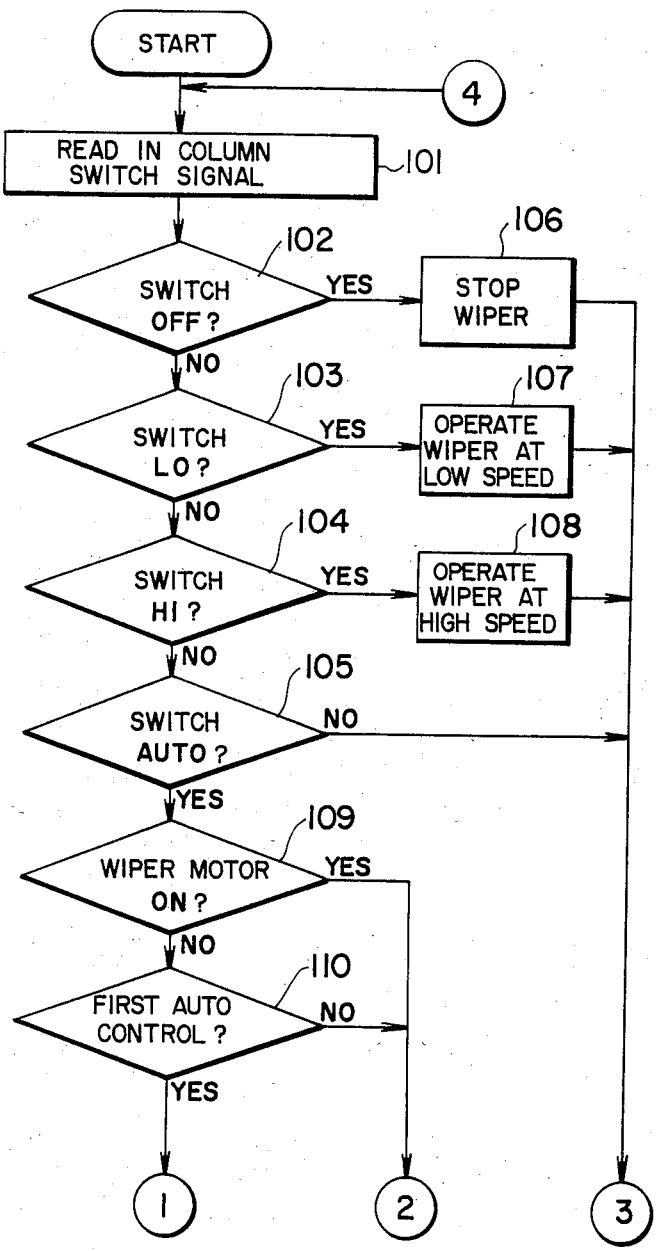
FIGS. 2A and 2B are simplified flow charts showing the operation of the microcomputer in the device of FIG. 1.
Figure 2B:
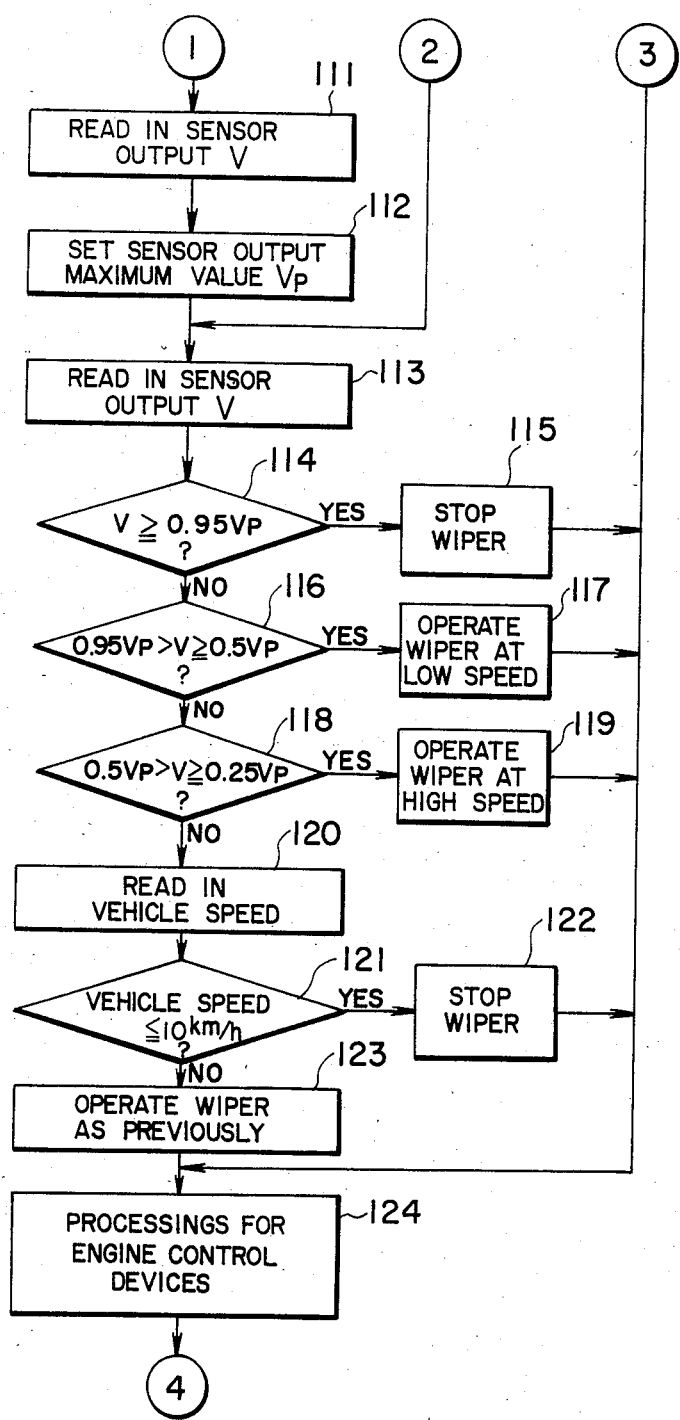

Referring to FIGS. 2A and 2B, there are illustrated simplified flow charts for the foregoing operations by the microcomputer 10. The flow chart of FIG. 2A shows the selection of the wiper operations in accordance with the column switch positions and the flow chart of FIG. 2B shows the wiper control operation performed when the column switch 14 is in the AUTO position.

Referring first to the flow chart of FIG. 2A, the microcomputer 10 reads in the state of an output signal from the column switch 14 at a step 101 and then discriminates the selected mode at steps 102 to 105. In other words, if the OFF mode is discriminated at the step 102, a transfer is made to a step 106 where the transistors $T_{r1}$ and $T_{r2}$ are both turned off and the wiper motor 12 is stopped. If the low speed mode (Lo) is discriminated at the step 103, a transfer is made to a step 107 where the transistors $T_{r1}$ and $T_{r2}$ are respectively turned on and off and the wiper motor 12 is brought into a low speed operation. If the high speed mode (Hi) is discriminated at the step 104, a transfer is made to a step 108 where the transistors $T_{r1}$ and $T_{r2}$ are both turned on and the wiper motor 12 is brought into a high speed operation. If the automatic mode (AUTO) is discriminated at the step 105, a transfer is made to a step 109 where it is determined whether the wiper motor 12 is in operation or not. If the decision of the step 109 is NO, a transfer is made to a step 110 where it is determined whether the automatic control of the wiper is made for the first time after the start of the engine by means of a flag or the like.

Referring next to the flow chart of FIG. 2B, a sensor output V indicating the absence of rain drops on the windshield is read in at a step 111 and the maximum value of the sensor output V is stored as Vp at a step 112. Then, the sensor output V is successively read in at a step 113 and compared with the stored value Vp at steps 114, 116 and 118. thus, when $V \geq 0.95$ Vp is determined at the step 114, a transfer is made to a step 115 so that no signal is generated for driving the transistors $T_{r1}$ and $T_{r2}$ and the wiper OFF mode is maintained thereby making a transfer to a step 124. If the wiper has already been in operation, the generation of the drive signal(s) is stopped and the wiper is stopped. If the decision of the step 114 is NO, a transfer is made to the step 116.

If the decision on 0.95 $Vp > V \geq 0.5$ Vp results in YES, a transfer is made to a step 117 where a drive signal for the transistor $T_{r1}$ is generated and the wiper is brought into the low speed operation. If the decision of the step 116 is NO, a transfer is made to the step 118 so that if a decision on 0.5 $Vp > V \geq 0.25$ Vp is YES, a transfer is made to a step 119 where a drive signal is generated for each of the transistors $T_{r1}$ and $T_{r2}$ and the wiper is brought into the high speed operation.

If the decision of the step 118 is NO, that is, if 0.25 $Vp > V$, a transfer is made to a step 120 where the vehicle speed is read in. Then, if the decision of the following step 121 shows that the vehicle speed is 10 km/h or less, a transfer is made to a step 122 where the wiper is stopped and a transfer is made to the step 124. If the decision of the step 121 is NO or the vehicle speed is higher than 10 km/h, then a transfer is made to a step 123 where the wiper operation performed up to now is continued. Then, at the next step 124, the processings required for the engine control devices are performed in accordance with the outputs of the sensors 9 and 13 and then a return is made to the step 101.

In addition to the above-described embodiment, the present invention is equally applicable to a case where a failure of the throttle sensor or the vehicle speed sensor occurs in the auto drive system so that in the case for example of the throttle sensor failure, the throttle value just before the failure is stored and the throttle value is decreased in accordance with the vehicle speed. It is evident that the present invention is applicable to the other automobile devices utilizing the various sensors.

In accordance with the present invention, since the output of a controlling main sensor is converted to a digital value and the existing microcomputer is utilized to detect the presence of abnormality of the converted value whereby upon detection of the abnormality one of preliminarily stored predetermined modes of operation is selected for the device to be controlled in accordance with the output signal of the other existing controlling sensor, e.g., the vehicle speed sensor which has been applied to the microcomputer, the device is always operated stably and moreover the microcomputer is used in common for other purposes thus reducing the number of components required additionally and reducing the cost of performing the invention.

We claim:

1. A method of controlling the operation of an electrical device mounted on a vehicle equipped with a running condition sensor for sensing the running condition of said vehicle, said method comprising the steps of:
   sensing a predetermined parameter required for the control of said electrical device by means of additional sensing means mounted on said vehicle;
   discriminating whether said sensed predetermined parameter is within a normal range or an abnormal range;
   controlling said electrical device in accordance with said sensed predetermined parameter when said parameter is discriminated to be within said normal range; and
   controlling said electrical device in accordance with an output of said running condition sensor when said sensed predetermined parameter is discriminated to be within said abnormal range.

2. A method according to claim 1, wherein said electrical device is a windshield wiper and said additional sensing means is a rain drop sensor.

3. A method according to claim 2, wherein said discriminating step includes:
   storing an initial value of rain drops sensed by said rain drop sensor at the initiation of controlling said wiper;
   establishing a reference value in accordance with said stored initial value; and
   comparing said rain drops sensed by said rain drop sensor with said established reference value.

4. A method according to claim 3, wherein said running condition sensor senses the running speed of said vehicle.

5. A method according to claim 4, wherein the controling of the electrical device in accordance with an output of the running condition sensor includes the steps of:
   comparing whether said sensed running speed is above or below a predetermined value;
   maintaining a previous operation of said wiper when said sensed running speed is above said predetermined value; and
   disabling the operation of said wiper when said sensed running speed is below said predetermined value.

* * * * *